United States Patent [19]

Brennen et al.

[11] 3,721,862

[45] March 20, 1973

[54] ELECTRICAL APPARATUS INCLUDING A GROUND FAULT SENSOR

[75] Inventors: Michael B. Brennen, Pittsburgh, Pa.; Guido Watson, Marlowes, Hemel Hempstead, Herts, England

[73] Assignee: Westinghouse Electric Corporation, Pittsburgh, Pa.

[22] Filed: Aug. 30, 1971

[21] Appl. No.: 175,880

[52] U.S. Cl. ............... 317/18 D, 317/26, 317/33 SC, 317/36 TD, 317/141 S, 317/148.5 B, 317/154
[51] Int. Cl. ............................................. H01h 47/18
[58] Field of Search ...... 317/18 D, 36 TD, 26, 33 SC, 317/141 S, 148.5 B, 154

[56] References Cited

UNITED STATES PATENTS

| 3,496,417 | 2/1970 | Tenenbaum | 317/33 SC |
| 3,539,866 | 11/1970 | Stevenson | 317/18 D |
| 3,543,094 | 11/1970 | South et al. | 317/36 TD |
| 3,567,997 | 3/1971 | Moran | 317/36 TD |

Primary Examiner—James D. Trammell
Attorney—A. T. Stratton et al.

[57] ABSTRACT

A ground fault detecting system including a current monitor, a ground fault sensor and a circuit breaker. The ground fault sensor responds to the presence of ground fault current to actuate a circuit breaker to open the circuit in which the ground fault current is flowing. The ground fault sensor includes circuit elements which perform corresponding circuit functions such as time delay and reset. The ground fault sensor is adapted to provide an adjustable or variable time delay so that the circuit breaker to be tripped may be delayed in tripping through a wide range of time periods after the initial sensing of the ground fault current.

5 Claims, 4 Drawing Figures

ELECTRICAL APPARATUS INCLUDING A GROUND FAULT SENSOR

CROSS REFERENCES TO RELATED APPLICATIONS

Certain inventions related to those disclosed in the present application are disclosed and claimed in copending applications Ser. No. 176,114 filed concurrently by John T. Wilson and Ser. No. 176,115 filed concurrently by Wardell Gary and John T. Wilson and assigned to the same assignee as the present application.

BACKGROUND OF THE INVENTION

This invention relates to ground fault detectors and it has particular relation to ground fault detectors with variable trip current level and time delay features.

In certain types of electrical apparatus, such as the ground current tripping circuit disclosed in U.S. Pat. No. 3,543,094 which is assigned to the same assignee as the present application, a separate timing capacitor and separate resetting capacitor are used within the electrical control circuit that actuates the tripping of a circuit breaker in response to the occurrence of a ground fault in the circuit protected by the circuit breaker. In addition, isolating diodes are provided between separate stages which are adapted to respond to increases or decreases in applied voltage or potential to operatively isolate stages from one another. Also various functions such as the comparison of voltages and the timing out or delaying of the tripping action which is to be initiated by the circuitry are separately performed so that the circuit is not adapted to the use of common circuit elements. Further, the circuit breaker actuating portion of the ground current tripping circuit has no memory function.

The main function of a circuit of the type described is to sense the presence of ground fault current in a circuit or system to be protected, by means of voltage comparison and the initiation of a timing period which may be adjustable. At the end of the latter period, the circuit produces an output signal which is applied to a circuit breaker causing the circuit breaker to open thus isolating or opening the circuit in which the ground fault current is flowing. However, if a diode between the timing stage and input stage is defective or faulty, certain problems may occur. For example, if the latter diode becomes open, a timing operation may be inadvertently initiated and the opening of the main contacts of the circuit breaker may consequently be actuated even though no ground fault exists. On the other hand, if the same diode were to be short circuited, it may be impossible to begin the timing cycle to eventually open the circuit breaker even though a ground fault current in fact exists. In another operating condition, the previously mentioned diode continuously conducts electrical current from the positive to the negative terminals of the power supply when the timing capacitor is not in a timing mode. This increases the probability that the diode may fail due to aging. Considering another aspect of a known circuit of the type described a capacitor is provided within the tripping circuit to cause a resetting of the timing cycle should the ground fault current which was initially sensed decrease below a predetermined level before the timing cycle has been completed. This capacitor is provided in addition to a separate timing capacitor, thus requiring the use of at least two separate capacitors or two separate timing means. It would be advantageous to have one element perform both functions. In the known circuit described, it is also possible for a resetting capacitive element to charge to a voltage value sufficient to cause a diode to become reverse biased thus actuating a timing capacitor to begin the timing cycle. However, should the electrical shock of biasing the diode to actuate the timing cycle cause weakened diode to fail to an open state and the ground fault current quickly decreases or subsides, the action of the resetting capacitive element will be ineffective to retard or stop the timing cycle initiated or in progress because the interposed diode will be incapable of conducting electrical current.

It would also be advantageous when sensing a ground fault current to have the capability of noting the presence or recent presence of a ground fault even though the ground fault current has decreased or been corrected.

SUMMARY OF THE INVENTION

In accordance with the invention, a current monitor provides a signal to a ground fault detector or sensor which after a suitable time, causes the tripping of a circuit breaker to be actuated so that its main contacts are opened thus isolating or protecting the circuit in which the ground fault current had flowed. The detector comprises a voltage comparator and a timing circuit with certain common components. For example, the collector resistor of a transistor in the voltage comparator also acts as a portion of the timing resistance of the timing circuit. In addition, the ground fault detector includes a single capacitive element which is used to perform the dual functions of timing out or delaying the tripping of the circuit breaker and resetting the ground fault detector should the ground fault current disappear or cease to flow in the protected circuit before the timing cycle has been completed.

The use of intrastage isolating diodes is minimized in the circuit of the disclosed ground fault detector. Consequently, the potential failures of diodes which may cause undesirable operating conditions to develop are eliminated. Should the ground fault detector detect the presence of a ground fault current in the protected circuit, the reliability of the disclosed detector in actuating the opening of the associated circuit breaker or interrupter is enhanced because of the absence of at least certain intracircuit diodes. Also, the circuit breaker actuating stage of the overall detector circuit is provided with a memory means so that once the signal has been provided to actuate the opening of the circuit breaker, the switching circuit will remain in a status to indicate a ground fault had occured even if the ground fault subsequently disappears. This serves as a memory means to indicate the recent presence of a ground fault.

BRIEF DESCRIPTION OF THE DRAWINGS

For a better understanding of the invention, reference may be had to the preferred embodiment exemplary of the invention shown in the accompanying drawings, in which.

DESCRIPTION OF THE PREFERRED EMBODIMENTS

Figure 1:
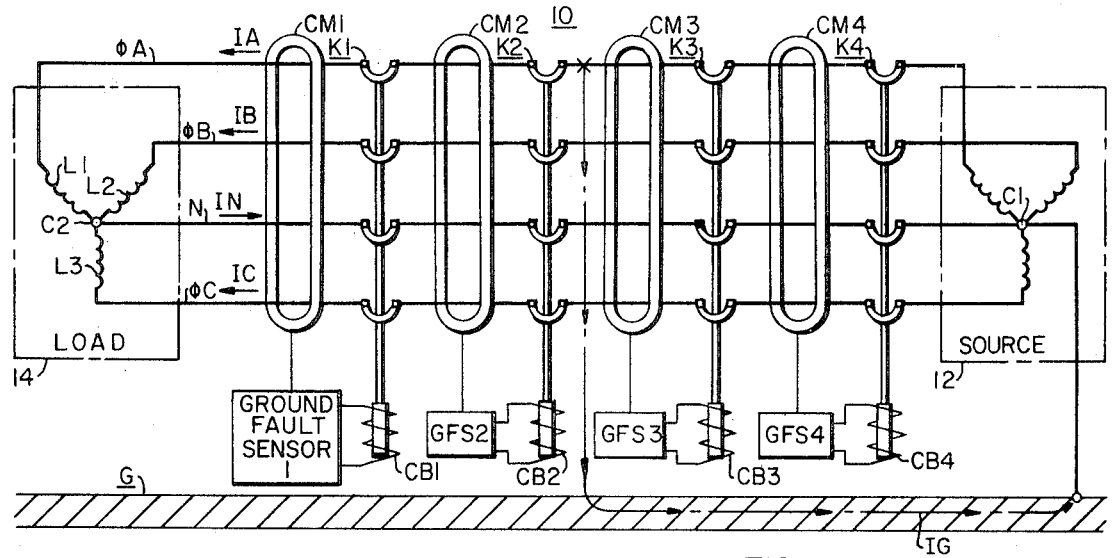
FIG. 1 shows an electrical transmission system including a plurality of ground fault sensors and associated circuit breakers.

Referring now to the drawings and FIG. 1 in particular, an electrical transmission system 10 which includes a source of electrical power 12 and an electric load 14 is shown. In this particular case, the source of the electrical power is connected in a wye configuration with a grounded neutral terminal as indicated at C1. The load is also connected in a corresponding wye configuration with a neutral or return wire N from its neutral terminal C2, which is connected to the grounded neutral terminal or point C1 of the source of electrical current or power 12. Electrical system 10 also includes the three phase conductors corresponding to phase A, phase B, and phase C as indicated, respectively, at $\phi A$, $\phi B$, and $\phi C$. Transmission system 10 includes in this case four ground loop monitors CM1, CM2, CM3 and CM4 and four corresponding ground fault sensors GFS1, GFS2, GFS3 and GFS4, respectively. In addition, the system includes four three-phase circuit breakers or interrupters designated CB1, CB2, CB3 and CB4 respectively.

Current monitor CM1 is connected to ground fault sensor GFS1 which in turn controls circuit breaker CB1 which includes a plurality of separable line contacts K1. Correspondingly, circuit breakers CB2, CB3 and CB4 have associated therewith similar ground current monitors, ground fault sensors and separable or movable line contacts.

It will be assumed that instantaneous current IA flows in phase A, current IB flows in phase B and current IC flows in phase C with a neutral current or return current IN flowing in line N during certain operating conditions. Current may flow in line N if the electrical load 14 has unbalanced load components L1, L2 and L3. However, since all four leads or line $\phi A$, $\phi B$, $\phi C$ and N are encircled by a current monitor such as CM1, the total induced current in each current monitor is normally substantially zero because the magnetic fluxes induced in monitor CM1 by the respective phase currents IA, IB and IC are balanced or neutralized by the oppositely directed neutral current IN. Since the currents are balanced, there is no zero sequence electrical current in that portion of the transmission line influencing CM1 and consequently, no signal is dispatched to ground fault sensor GFS1 and the contacts K1 of circuit breaker CB1 remain closed.

In considering current monitor CM3 and current monitor CM4, it will be noted that a ground fault current IG flows within the perimeter or through the primary coils of CM3 and CM4 to ground G and through a return path to the neutral terminal C1 of electrical source 12. This current IG generates a component of zero sequence electrical current which induces currents into sensing loops or current transformers CM3 and CM4.

Since the ground fault current IG may be of insufficient magnitude to trip either circuit breaker CB3 or circuit breaker CB4 but which may nevertheless do damage either to one of the circuit breakers CB3 or CB4 or to equipment near the respective circuit breakers it is necessary to interrupt or stop the flow of ground fault current IG. In this particular case, ground fault sensor GFS3 and ground fault sensor GFS4 will sense the respective currents induced into the loops of current transformers CM3 and CM4 and respond to actuate the opening of the contact K3 and K4 of circuit breaker CB3 and circuit breaker CB4 respectively.

Figure 2:
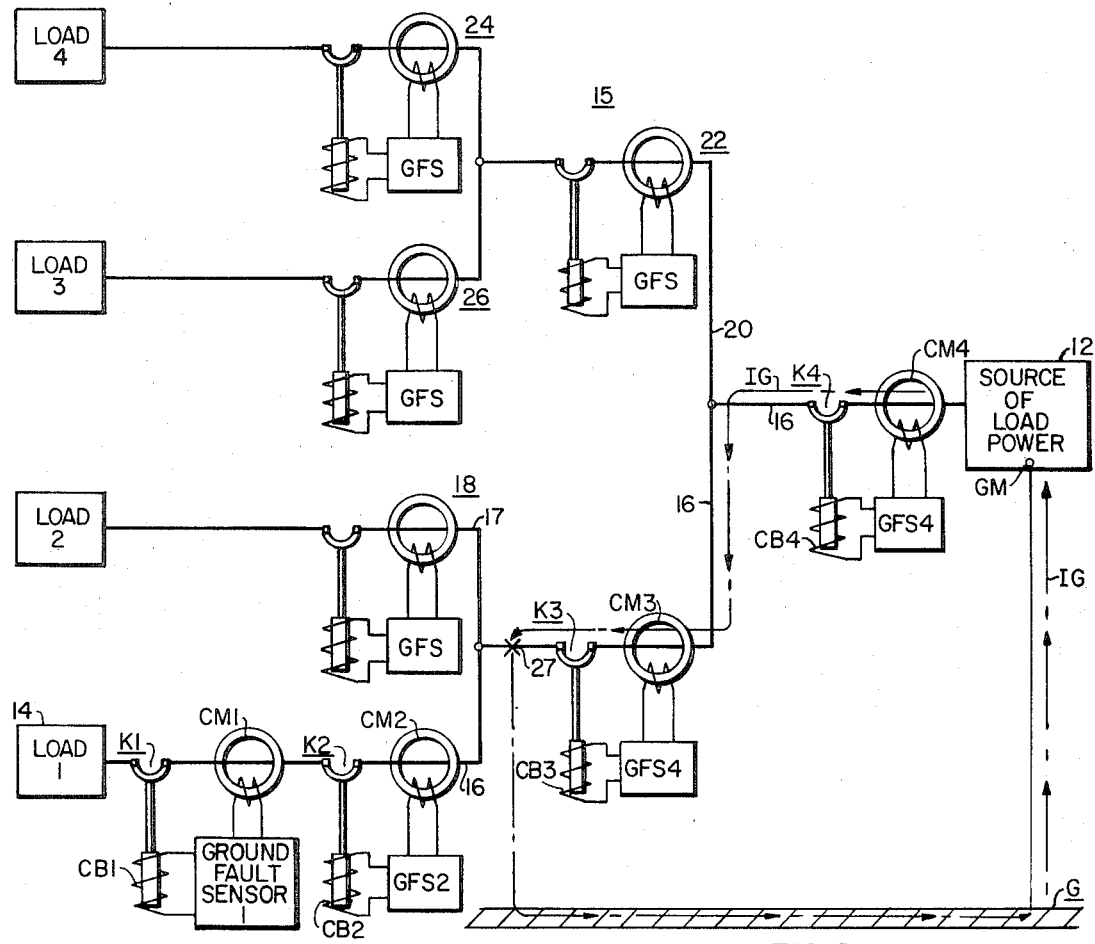
FIG. 2 shows a transmission system arranged in a branching network with a plurality of ground fault sensors and ground fault detectors.

Referring now to FIG. 2, another example of the application of ground fault detectors and ground fault detection systems is shown in electrical transmission system 15. It will be noted that the system 15 includes a three-phase electrical source 12 which may be wye connected and which has a grounded neutral terminal or point GM. The system 15 also includes an electrical load 14 which is also indicated as "LOAD 1." It will also be noted that there is a portion of transmission system 15 indicated as transmission line 16 which is protected by circuit breakers CB1, CB2, CB3 and CB4 similarly to the manner in which the circuit breakers described in connection with FIG. 1 protect transmission system 10. Associated with the circuit breakers CB1, CB2, CB3 and CB4 are similar current monitors CM1, CM2, CM3, and CM4, respectively and ground fault sensors GFS1, GFS2, GFS3 and GFS4, respectively. Consequently, the electrical system 15 comprising these last-mentioned components, is similar to the electrical system 10 shown in FIG. 1. However, it will be noted that electrical system 15 includes a plurality of brank circuits as indicated by transmission lines 17 and 20, for example, which provide a plurality of paths for electrical power from electrical source 12 to flow to additional electrical loads such as LOADS 2, 3 and 4 respectively. LOAD 2 is protected by the protective system 18 which includes a current monitor, ground fault sensor, and a circuit breaker. LOADS 3 and 4 are protected by the similar protective systems 22, 24 and 26. When a ground fault occurs, such as indicated at point 27 in transmission line 16, current monitor CM3 and ground fault sensor GFS3 will respond to the presence of ground current IG to actuate circuit breaker CB3 to open contacts K3 and to isolate LOADS 1 and 2 from the source of electrical power 12. It is possible that the ground fault detector system comprising current monitor CM4, ground fault sensor GFS4, and circuit breaker CB4 having contacts K4 may be timed or delayed to respond more slowly than the previously mentioned ground fault detector GFS3, so that if circuit breaker 3CB3 is actuated to open and to prevent current IG from flowing to ground or through point 27, circuit breaker CB4 may not open immediately and the flow of power to LOADS 3 and 4 through circuit breaker systems 22, 24 and 26 may remain uninterrupted.

Figure 3:
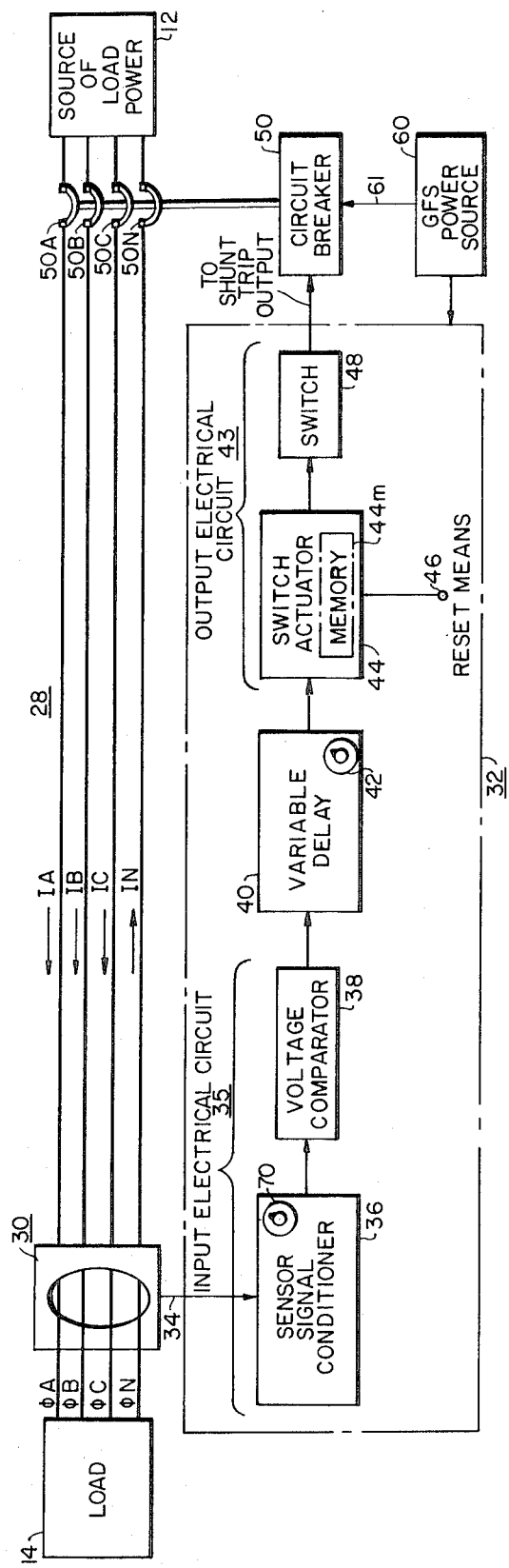
FIG. 3 shows a functional block diagram of a ground fault sensor interconnected with an electrical transmission system, a current monitor and a circuit breaker.

Referring now to FIG. 3, ground fault detector system 28 comprises a source of three-phase alternating current power 12 and an electrical load 14 similar to those shown in FIGS. 1 and 2. In addition, instantaneous phase currents IA, IB, IC flow in phases $\phi A$, $\phi B$ and $\phi C$, respectively, and return current or neutral current IN flows in neutral wire N for a particular operating condition of the system 28. A current monitor or current transformer 30 completely encircles all of the transmission leads or lines as indicated at $\phi A$, $\phi B$, $\phi C$ and N, which are connected between the source of load power 12 and the load 14. The system 28 includes a circuit breaker 50 having contacts 50A, 50B, 50C and 50N for protecting lines or transmission leads $\phi A$, $\phi B$, $\phi C$ and N, respectively. As illustrated the source of power 12 and the load circuit 14 are connected in a wye arrangement but are not necessarily limited to that type of three-phase electrical connection.

Circuit breaker 50 is controlled at lease during certain operating condition by a ground fault sensor 32. Ground fault sensor 32 has input loads or detector input 34 through which energy or electrical current from current sensor 30 may be provided to the ground fault sensor 32. Ground fault sensor 32 as illustrated is provided with its own or separate source of power 60 which may be any conventional source of electrical power, such as a source of unidirectional or direct current voltage or a source of alternating current voltage. Ground fault sensor 32 comprises three functional sections or circuits which include an input electrical circuit 35, a variable time delay circuit or variable delay section 40 and an output electrical circuit 43. Electrical current from the current monitor 30 which varies with the ground fault current in the system 28 is applied to and flows in leads or line 34 whereupon it is conditioned by the input electrical circuit 35 so that it may be applied as an output to the variable delay means 40. The energy or output from the variable delay means 40 is provided to the output electrical circuit 43 whose output, in turn, is applied to circuit interrupter or breaker 50.

Input electrical circuit 35 as illustrated may comprise a sensor signal conditioner 36 with an electrical sensitivity control 36a, and a voltage comparator 38. Output electrical circuit 43 may comprise a switch actuator 44 which, in turn, may include a memory means 44m. Switch actuator 44 provides energy to a switch or switching means 48.

To sum up, ground fault sensor 32 may comprise five separate functional sections or circuit portions which include a sensor signal conditioner 36 which receives energy or an output from current monitor 30, a voltage comparator 38 which receives energy or a signal from sensor signal conditioner 36, a variable time delay circuit 40, having a variable time delay control 42, which receives information or electrical signals from voltage comparator 38, a switch actuator, 44 which may include a memory means 44m and which receives an electrical signal from the variable delay circuit 40, and finally a switch or switching circuit 48 which receives energizing information or a signal from switch actuator 44. Switch actuator 44 as illustrated includes a reset means as indicated by 46.

In the operation of the ground fault sensor 32, if a ground fault current is detected in electrical transmission system 28, current monitor 30 will be energized to produce an output electrical current at terminal or input 34 of the sensor signal conditioner 36 of the ground fault sensor 32 which will convert that signal to a voltage whose value is dependent upon the adjustment of the sensitivity control 36A. The latter voltage will then be applied to voltage comparator 38 and if the voltage is of a predetermined value, an output signal will be provided to the variable time delay circuit 40. Variable time delay circuit 40 will commence to provide an output signal after substantially a fixed or predetermined time interval later as determined by the adjustment of the time delay control 42. This signal will be applied to the switch actuator circuit 44 which will, in turn, supply energizing power or an output to switch circuit 48 which will then energize the shunt trip coil of circuit breaker 50 causing the circuit breaker 50 to actuate each of the circuit breaker contact 50A, 50B, 50C and 50N, to the open position.

In the event that the ground fault disappears or is corrected within the time delay preset with or determined by the time delay control 42, no energizing signal will be provided to the switch actuator circuit 44 and, consequently, circuit breaker 50 will not be actuated to an open circuit operating condition. In addition, actuator circuit 44 may include a memory means 44m, and once the actuator circuit 44 has been actuated to provide a signal to open the circuit breaker 50, an indication of the presence of the latter signal may be provided.

Figure 4:
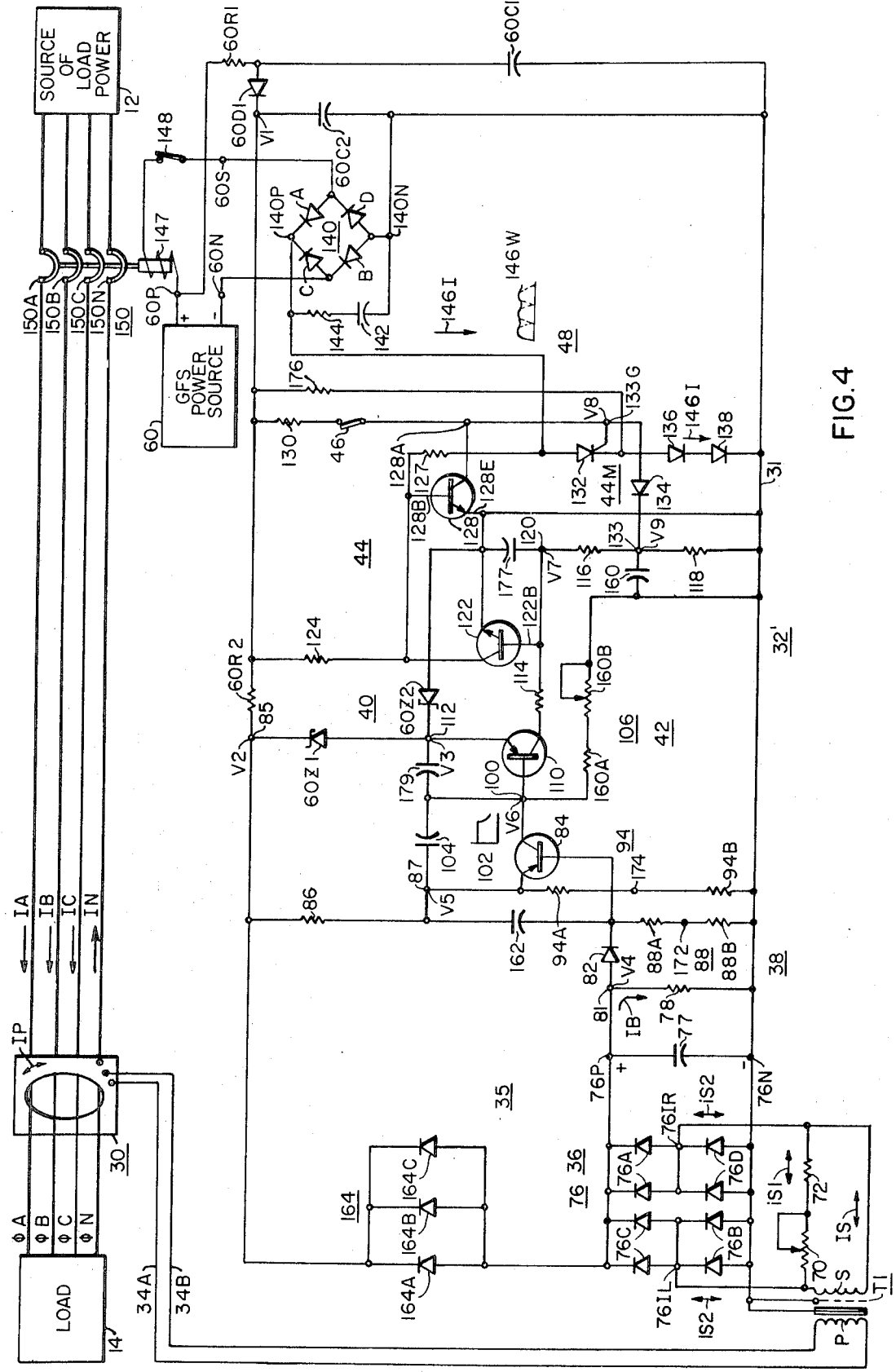
FIG. 4 shows a circuit or schematic diagram of the system illustrated in block form in FIG. 3.

Referring now to FIG. 4, an electrical circuit or system 32' which may represent in detail ground fault sensor 32 is shown. The connections to the source of power 12 and load circuit 14 are indicated in FIG. 4. Phase currents IA, IB, IC are shown flowing in phases $\phi A$, $\phi B$, $\phi C$, respectively, and neutral current IN flowing in neutral wire N. In addition, circuit breaker contacts 150A, 150B, 150C and 150N are adapted to be actuated to the open positions to isolate load circuit 14 from source of power 12. In the event that a ground fault current is sensed by current monitor or loop current transformer 30, an induced primary alternating current IP flows into the primary winding terminals 34B and 34A of the primary winding P of transformer T1. Consequently, a secondary current IS flows in the secondary winding S of transformer T1. Current IS is divided into two components which include current component IS1 which flows through resistors 72 and 70, which are connected in parallel with or across the secondary winding S of transformer T1, where resistor 70 is adjustable or variable to provide a lower or higher resistive load for current IS so that the component of current IS1 flowing through resistors 70 and 72 may be made relatively larger or smaller. The adjustable resistor of rheostat 70 comprises a sensitivity control means 42. The second component is current IS2 which flows into a bridge circuit 76 through input terminals 76 IL and 76 IR and may be made relatively larger or smaller in magnitude for the same magnitude of primary current IP by varying resistance means 70. The direct result of this circuit arrangement is to provide an output current IB which flows from positive output terminal 76P of bridge 76 to negative output terminal 76N of bridge 76. Current IB flowing through resistor 78 produce or develop a sufficient magnitude of unidirectional current voltage V4 at point of junction 81 to actuate the remaining circuits of the ground fault sensor 32'.

The magnitude of voltage V4 produced or developed by the current IB flowing through resistor 78 is regulated by filter capacitor 77 and may typically be of such a value that a ground fault current having a magnitude of five amperes may produce a current IP in the current monitor 30 which is sufficient to create a value of voltage V4 which will cause the ground fault sensor 32' to actuate the operation of the circuit breaker or circuit interrupter 150.

When voltage V4 reaches a value which is sufficient to bias isolating diode 82, in the forward direction the normally conducing or turned-on transistor 84 will be turned off. Transistor 84 may be of the PNP variety and have resistance means or resistor 86 connected to its emitter. The other end of resistor 86 being connected to the positive terminal of a source of voltage V2 which may be supplied by a separate ground fault sensor power source or unidirectional or direct current voltage. Voltage V2 may for example be a highly regulated 15 volt recitified direct current voltage. Also connected to the emitter of transistor 84 is a resistive means or component 94 which may comprise a single resistive element or a pair of resistors 94A and 94B connected in series circuit relationship with one another. Connected to the base of the transistor 84 is the cathode of the previously mentioned isolating diode 82 and a base drive resistor 88 which may comprise a pair of resistors 88A and 88B connected in series circuit relationship with one another. Connected between the emitter and collector of transistor 84 is a multi-purpose timing capacitor 104. The multi-purpose timing capacitor comprising a combination reset and timing means. Normally, electrical current flows from the positive terminal of source V2 through emitter resistor 86 and the resistor 94 (or resistors 94A and 94B), and back to the other terminal of source V2. This current establishes a voltage V5 at junction 87 or at the emitter of transistor 84 which may be approximately 12 volts. This voltage, V5, is sufficient to normally forward bias transistor 84 and cause current to flow into the base drive resistor 88. Considering the voltage at the junction point between the anode of the diode 82 and the resistor 88, as long as voltage V4 is insufficient to forward bias diode 82 and, consequently, turn off or actuate transistor 84 to a substantially non-conducting condition then a virtual short circuit will be effective across the timing or reset capacitor 104. The voltage at the output terminal 100 or lower end of capacitor 104 is then substantially equal to the voltage at the common conductor 31. Junction point 100 is connected to terminal 76N of bridge circuit 76 through a resistor or resistive element 106 which may comprise a pair of resistors 106A and 106B where resistor 106B may be variable. Normally current flows from the collector of transistor 84 to resistance means 106. When current flows through resistor 106 (or the pair of resistors 106A and 106B) then the voltage V6 at junction point 100 is substantially equal to voltage V5 the difference being the emitter to collector voltage drop across transistor 84. But transistor 84 is turned off or actuated to a substantially non-conducting condition, then current flow to the resistive means 106 from the collector of transistor 84 is negligible and voltage V6 changes. But voltage V6 is constrained to not change instantaneously because of the time required for capacitor 104 to charge. The R-C time constant for charging capacitor 104 is determined by the values of capacitor 104 and resistors 86, 106A and 106B and may be varied by changing the value of resistor 106B which is adjustable or variable. As capacitor 104 charges, voltage V6 at junction point 100 changes toward a zero voltage value.

If V4 decreases to a value sufficient to forward bias transistor 84 then capacitor 104 discharges or resets through the collector to emitter current of transistor 84. Junction point 100 is connected to the base of a second transistor 110. Transistor 110 is normally off or substantially non-conducting when voltage V6 is higher than the voltage V3 at the junction or emitter 112 of the PNP transistor 110. However, as voltage V6 approaches the value of the voltage at the common conductor 31, transistor 110 is turned on or actuated to a saturated condition and current flows from the voltage source indicated at V3 through the emitter to collector circuit of transistor 110 and the resistors 114, 116 and 118, to the negative terminal 76N of the bridge network 76. Voltage V3 may for example be a direct current voltage of approximately 6.8 volts which is positive with respect to the voltage at the terminal 76N. As current flows through the resistors 114, 116, 118, voltage values are established or result at junction points 120 and 133 which are indicated as voltages V7 and V9, respectively.

Junction point 120 is connected to the base of a third transistor 122 which is normally in the off or substantially non-conducting state because voltage V7 at base 122B is very low or near a zero value, relative to the voltage of source V1. Consequently, current from voltage source V1 flows through resistor 124 into the base 128B of transistor 128 and through the base to emitter current of transistor 128 to the terminal 76N. This base drive current normally forward biases or maintains transistor 128 in a conducting state. However, should voltage V7 rise, such as the case when transistor 110 is turned on, the collector to emitter circuit of transistor 122 is actuated to a conducting state. Consequently some of the current which had previously been flowing into the base 128B of transistor 128 is shunted through or transferred to the collector-to-emitter circuit of the conducting transistor 122. As a result, transistor 128 ceases to conduct or is actuated to a substantially non-conducting condition. When transistor 128 ceases to conduct, current flowing from voltage source V1 through resistor 130 and the collector-to-emitter circuit of transistor 128 ceases to flow or decreases to a negligible value. The voltage V8 at gate terminal 133G of gating means or switch 132 increases in a positive direction because the voltage drop across the resistor 130 due to current flowing through resistor 130 substantially decreases. An increase in voltage V8 causes silicon controlled rectifier (SCR) or gated static switch 132 to conduct electrical current from its anode to its cathode and through diodes 136 and 138 to the negative terminal 76N of bridge 76. This current flows into the latter anode from voltage source V1 through resistor 124 and resistor 127 which are connected in series with the anode of the SCR 132. The silicon controlled rectifier 132 as illustrated is connected across the output terminals, 140P and 140N, of an input power supply bridge circuit 140. The actuating or turning on of silicon controlled rectifier or thyristor 132 in effect completes a circuit or current carrying path between the output terminals of bridge 140 and allows current to flow through certain associated components.

In order to provide a memory means 44m, the increase in voltage V8 at gate or terminal 133G is fed through a forward biased diode 134 to junction point 133. The voltage at junction point 133 increases to a voltage value indicated at V9. This increase in voltage V9 is reflected by means of resistor 116 to junction point 120 causing V7 to increase proportionally. Consequently, the base 122B of transistor 122 is kept forward biased regardless of what happens in the previously mentioned associated preceding stages of the circuit until the gate voltage V8 at terminal 133G is once again lowered or decreased by a second reset means 46 which includes means for operatively disconnecting power source V1 from gate 133G. Operation of the latter means also causes a reset of the memory means 44m. In this particular embodiment, current 146I which flows into the anode of controlled rectifier 132 comprises full wave rectified current, such as is shown by wave shape or pulse train 146w.

The ground fault sensor power supply 60 may, for example, supply a sixty cycle, alternating current voltage of any desired value. Power supply 60 as illustrated has a first terminal 60P which may be instantaneously positive and a second terminal 60N which may be instantaneously negative. It is assumed that initially one-half wave of alternating current may flow from the instantaneously positive terminal 60P through a circuit breaker shunt trip coil 147, through a closed control switch 148 into terminal 60S and to diode 140A of bridge circuit 140. The current will then flow through diode 140A to the positive terminal 140P of the full wave rectifier bridge circuit 140 and through the conducting silicon controlled rectifier 132 and the series connected diodes 136 and 138 to the negative terminal 140N of the bridge circuit 140 and through diode 140B to the other terminal 60N of the power supply 60. When the alternating current from the power supply 60 changes polarity during the next half cycle, the voltage at the terminal 60N will be instantaneously positive with respect to the voltage at the terminal 60P and current will flow from terminal 60N through diode 140C to positive terminal 140P of the bridge circuit 140, silicon controlled rectifier 132, diodes 136 and 138 to negative terminal 140N and continue through diode 140D of bridge 140 to terminal 60S of the ground fault detector 32'. From terminal 60S, current flows through switch 148 and the circuit breaker shunt trip coil 147 to the other terminal 60P of the ground fault sensor power source 60. It will be noted that the ground fault detector power source 60 may also supply the power to generate voltages V1, V2 and V3 of the ground fault detector 32' and it also should be noted that it is possible for ground fault detector power source 60 to have a voltage range between 40 and 120 volts ("AC or DC") and still actuate the components of ground fault detector 32' as well as to energize the shunt trip coil 147. Voltages V1, V2 and V3 which were previously spoken of may be direct current voltages having values of approximately 110 volts, 15 volts and 6.8 volts, respectively. The terminal 60P of power source 60 is also connected to a resistor 60R1 which is connected at its other end to a diode 60D1 and a storage capacitor 60C1. If the power source 60 supplies a direct current voltage, diode 60D1 may be forward biased and capacitor 60C1 charged to the value of the storage present at the terminal 60P of ground fault detector power source 60. This voltage may be for example 40 volts direct voltage. If the source 60 supplies alternating current, then only positive fluctuating half cycles will be present at the cathode of diode 60D1. The cathode of diode 60D1 is connected to a second capacitor 60C2 which acts as a combination filter capacitor and energy storage capacitor. It will be noted that voltage V1 may be regulated to a relatively lesser degree in the case of an alternating current source of power 60 but the source 60 is nevertheless effective to provide power through resistor 60R2 to energize Zener diodes 60Z1 and 60Z2 to produce highly regulated values of voltages V2 and V3, at terminals or junctions 85 and 112, respectively.

A capacitor 142 and a resistor 144 are connected in series circuit combination across or in parallel with the series circuit which includes the silicon controlled rectifier or gated value 132 and diodes 136 and 138. The capacitor and resistor combination which includes the capacitor 142 and the resistor 144 serves a dual purpose. First, it prevents a spurious anode turn-on or triggering of silicon controlled rectifier 132 because a high rate of voltage change with respect to time is impressed across the anode-to-cathode circuit of silicon controlled rectifier 132. The capacitor 142 and resistor 144 absorb or suppress the high values of voltage rise with respect to time. Since the capacitor 142 and resistor 144 are also connnected in series across the output terminals of bridge 140 they act as a filter network for any fluctuating component of current 146I from the output terminals of bridge 140. In addition, capacitors or capacitive elements 162, 179, 177 act as voltage spike suppression capacitors or means for transistors 84, 110 and 122 respectively. Capacitor or capacitive element 160 also has a voltage spike suppression means.

Bridge circuit 76 comprises parallel diode pairs 76A, 76B, 76C and 76D. These diodes are arranged in parallel pairs to accommodate large values of current in bridge circuit of full wave rectifier means 76.

Parallel diode array 164 which may comprise a plurality of diodes 164A, 164B, and 164C are arranged in parallel circuit relationship. The respective anodes of each of the named diodes are connected to positive terminal 76B and of bridge circuit 76 the cathodes are connected to the regulated voltage source V2 at junction point or terminal 85. These diodes provide a high current short circuit path into the voltage source V2 should the value of V4 rise to such a high value as to endanger the integrity of transistor 84 by excessive reverse base to emitter voltage. Arrary 164 therefore may act as a voltage regulation means during certain operating conditions for the position terminal 76P of bridge 76.

It is to be understood that current monitor 30 may comprise a plurality of individual current monitors or current transformers for each wire in the multi-phase or three-phase system with the outputs of said monitors being summed at a summing point. It is also to be understood that in practice the ground fault detector may sense ground faults in a perfectly balanced or nearly perfectly balanced three-phase system in which the neutral wire N is not included within the periphery of the current monitor 30. In addition, it is to be understood that the source of power and load may be adapted to any of the common types of electrical load configurations such as a "Δ" configuration for both, wye "Y" configuration for both, Δ-Y configuration or Y-Δ configuration respectively. Multi-phase systems other than those of three-phase type may also be monitored. It is also to be understood that the circuit interrupter, such as circuit breaker 150, need not necessarily have a separate set of contacts 150N to disconnect the neutral lead as illustrated. In addition, it is to be understood that the current monitor 30 and associated ground fault detector system 32 may be used or utilized to detect other types of electrical system faults. For example, a fault to a system common lead, such as the outer housing of enclosed bus duct, may also be detected by the ground fault sensor. It is also to be understood that the time delay range of the sensor may be varied, between the time period encompassed by 5 cycles of alternating current and the time encompassed by 40 cycles of alternating current.

The apparatus embodying the teachings of this invention has several advantages. First, the accuracy of the delay time is closely maintained over a wide temperature range. In addition, the accuracy in detecting ground fault or trip current levels is relatively high. Also, the delay time which may be adjustable is virtually independent of the value of the input current IS once the input trip current level has been reached because diode array 164 performs a regulating function and it shunts excessive current away from terminal 76P of the input bridge. Another advantage lies in the fact that a memory 44m of a trip condition may be provided within the switching actuator 44, regardless of what happens at any external loads such as the shunt trip coil of the circuit breaker. A further advantage lies in the use of common circuit components such as capacitor 104 and resistor 86 to perform multiple circuit functions. Also an advantage lies in using a minimum of isolating diodes between stages of the ground fault sensor to reduce the chances of failure of the overall sensor due to a diode failure.

I claim as my invention:

1. Electrical apparatus for sensing the presence of ground fault current in a polyphase electrical transmission system and for actuating the opening of the contacts of a circuit interrupter which forms part of the transmission system a predetermined time after a predetermined ground fault electrical current has been sensed, comprising first means responsive to the ground fault current in said system for providing a first output signal when said ground fault currents exceeds a predetermined level, timing means connected to first means for providing a second output signal following substantially a predetermined time delay after said first means provides said first output signal, said timing means including means for resetting said timing means if said ground fault current decreases below said predetermined level before the end of said predetermined time delay, additional means connected to said timing means for providing a third output to actuate said circuit interrupter to open said contact when said timing means provides said second output signal, said additional means including a memory means for actuating said additional means to continue to provide said third output after said timing means provides said second output signal.

2. A ground fault current detector for actuating the contacts of an electrical circuit interrupter to open in response to ground fault current in an electrical system protected by the circuit interrupter which is sensed by current monitor means for obtaining an output current which varies with the ground fault current in said system, comprising an input electrical circuit adapted to be connected in circuit relation with said current monitor means, a variable time delay means connected in circuit relation with said input circuit, and an output electrical circuit connected in circuit relation with said time delay means, said input electrical circuit being adapted to receive said output current from said current monitor means and to provide a first output signal for actuating said time delay means when said output current from said current monitor means exceeds substantially a predetermined level, said time delay means including a timing means to provide a second output signal to said output electrical circuit after substantially a predetermined time delay following said first output signal, said output electrical circuit being responsive to said second output signal from said time delay means to provide a third output which actuates said circuit interrupter to open said contacts, said delay means being adapted to reset said ground fault detector when said first output signal decreases below said predetermined level before said predetermined time delay has ended, said output electrical circuit including a memory means, said memory means being connected to maintain said third output after said first output signal has ceased and after said time delay means has provided said second output signal to said output electrical circuit.

3. The combination as claimed in claim 2, wherein said input electrical circuit comprises a signal conditioner and a voltage comparator connected in circuit relation and said output electrical circuit comprises a switch actuator circuit and an electrical switching circuit connected in circuit relation, said signal conditioner being connected to said current monitor means for receiving said output current from said current monitor, said signal conditioner having an output terminal and being adapted to provide an output voltage signal which is generally proportional to the output current of said current monitor means and which is applied to said voltage comparator, said voltage comparator being responsive to said output voltage signal to produce said first output signal when said output voltage signal of said signal conditioner exceeds substantially a predetermined value which corresponds to said predetermined level of said output current of said current monitor means, said time delay means being adapted to provide said second output signal to actuate said switch actuator of said output electrical signal to produce a switch actuating output signal which actuates said electrical switching circuit to provide said third output following said predetermined time delay, after said first output signal from said voltage comparator actuates said time delay means.

4. The combination as claimed in claim 3, wherein said switch actuator circuit includes said memory means and a second reset means connected in circuit relation with said switching circuit, said switch actuator circuit being actuated by said memory means of said switch actuator circuit to continue to provide said switch actuating output signal after being actuated to provide the latter signal until reset by said second reset means.

5. The combination as claimed in claim 4, wherein said variable delay means includes a capacitive element connected in series circuit relationship with a first resistive element and said voltage comparator means comprises a transistor device having an emitter, a collector and, a base terminal, an emitter resistive element and a source of electrical power, said emitter terminal being electrically connected to one end of said emitter resistive element and to one end of said capacitive element of said variable delay means, said source of electrical power having a positive and a negative terminal, the other end of said emitter resistive element being electrically connected to said positive terminal of said source of electrical power, said collector of said transistor being connected to the other end of said capacitive element and to one end of said first resistive element, the other end of said first resistive element being connected to said negative terminal of said source of electrical power, said capacitive element and said first resistive element having an output junction terminal interposed therebetween, said output junction terminal being connected in circuit relation with said switch actuator circuit to provide said second output signal to said switch actuator circuit, said capacitive element being charged through said emitter resistive element and said first resistive element from said source to provide said predetermined time delay when the base to emitter circuit of said transistor is actuated to a reverse bias state by applying said first output signal at said base, the voltage value at said output junction terminal changing as said capacitive element charges to a value which comprises said second output signal and is sufficient to actuate said switch actuator circuit to provide said switch actuating signal, said capacitive element being connected to said transistor device to prevent actuation of said circuit interrupter by discharging through the emitter to collector of said transistor device if during said predetermined time delay period the base to emitter circuit of said transistor is actuated to a forward biased state by a decrease in said first output signal at said base, the voltage at said output junction terminal then being prevented from further changing value to a value which is sufficient to actuate said switch actuator circuit, said switching circuit comprising a silicon controlled rectifier having a gate terminal, said switch actuator circuit including an input terminal, said gate terminal being electrically connected to said last-mentioned input terminal so that said gate actuates said controlled rectifier to a conducting state when said switch actuating signal is applied to the voltage at said gate is coupled at lease in part to said input terminal of said switch actuator circuit to maintain said controlled rectifier in a conducting state independently of any other signal applied to said input terminal.

* * * * *